US009406091B1

(12) United States Patent
Lopez et al.

(10) Patent No.: US 9,406,091 B1
(45) Date of Patent: Aug. 2, 2016

(54) PERSONA BASED RECOMMENDATIONS (75) Inventors: Gustavo Eduardo Lopez, Seattle, WA (US); Michael M. George, Mercer Island, WA (US); Bhushan H. Shah, Seattle, WA (US); Andrew Russell Turner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 562 days.

(21) Appl. No.: 13/418,072

(22) Filed: Mar. 12, 2012

(51) Int. Cl.
*G06F 7/00* (2006.01)
*G06F 17/30* (2006.01)
*G06Q 50/00* (2012.01)
*G06Q 30/02* (2012.01)

(52) U.S. Cl.
CPC ............ *G06Q 50/01* (2013.01); *G06Q 30/0224* (2013.01)

(58) Field of Classification Search
None
See application file for complete search history.

(56) References Cited

U.S. PATENT DOCUMENTS

| 6,269,343 | B1 | | 7/2001 | Pallakoff | |
|---|---|---|---|---|---|
| 6,512,525 | B1 | * | 1/2003 | Capps | G06F 9/44505 715/762 |
| 6,928,558 | B1 | * | 8/2005 | Allahwerdi | G06F 21/31 713/172 |
| 7,021,534 | B1 | * | 4/2006 | Kiliccote | G06F 21/606 235/380 |
| 7,613,692 | B2 | * | 11/2009 | Hamilton et al. | |
| 7,668,747 | B2 | | 2/2010 | Murphy et al. | |
| 7,672,897 | B2 | | 3/2010 | Chung et al. | |
| 2003/0225785 | A1 | * | 12/2003 | Arellano | G06F 17/30702 |
| 2005/0060532 | A1 | * | 3/2005 | Dorenbosch | H04M 1/72563 713/100 |
| 2008/0172464 | A1 | * | 7/2008 | Thattai | H04L 67/306 709/205 |
| 2010/0210304 | A1 | * | 8/2010 | Huslak | G06Q 10/10 455/558 |
| 2011/0054991 | A1 | * | 3/2011 | Orellana | G06Q 30/02 705/14.23 |
| 2011/0313757 | A1 | * | 12/2011 | Hoover | G06F 17/274 704/9 |
| 2012/0069131 | A1 | * | 3/2012 | Abelow | G06Q 10/067 348/14.01 |
| 2012/0100869 | A1 | * | 4/2012 | Liang et al. | 455/456.1 |
| 2012/0151046 | A1 | * | 6/2012 | Weiss | G06F 21/604 709/224 |
| 2012/0151047 | A1 | * | 6/2012 | Hodges | G06F 21/604 709/224 |
| 2012/0203846 | A1 | * | 8/2012 | Hull | G06Q 10/107 709/206 |
| 2012/0239486 | A1 | * | 9/2012 | Hu et al. | 705/14.39 |
| 2013/0086167 | A1 | * | 4/2013 | Blom | 709/204 |
| 2013/0139241 | A1 | * | 5/2013 | Leeder | H04W 12/06 726/9 |
| 2013/0196601 | A1 | * | 8/2013 | Bobrow | H04B 7/24 455/41.2 |
| 2014/0075385 | A1 | * | 3/2014 | Wan | G06Q 10/1093 715/812 |

* cited by examiner

Primary Examiner — Hexing Liu
(74) Attorney, Agent, or Firm — Lee & Hayes, PLLC (57) ABSTRACT

Location data may be obtained through devices associated with one or more users. The actual locations and places that correspond to the location data may be inferred. Location patterns that represent when and where each user spends their time may also be determined. One or more personas that represent categories corresponding to types of behavior or location patterns that users may exhibit may be created and maintained. One or more of the personas may be assigned to or associated with each of the users based on the location patterns associated with each user and the type of behavior that is expected to be exhibited for each persona. One or more recommendations may be provided to the users based at least partly on the personas that have been assigned to the users, which may cause the users to receive recommendations that are likely to be of particular interest.

26 Claims, 4 Drawing Sheets

PERSONA BASED RECOMMENDATIONS

BACKGROUND

Social networks and other services allow a user to share information with other users and also to monitor the actions of those users. More particularly, users may exchange messages with one another, specify likes or dislikes, and may identify places (e.g., restaurants, stores, etc.) that the user has previously visited or is currently visiting. For instance, while a particular user is physically located at a particular merchant, the user may indicate to other users that the user is currently visiting that merchant. The users may access this information through a central site or through notifications that are transmitted to an account or a device associated with the users. However, existing systems appear to be limited to sharing current or past locations associated with users for the purpose of informing other users of their respective whereabouts. Moreover, from these physical locations, other users may learn or infer various types of information about those users, such as user preferences, likes, dislikes, etc.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

This disclosure describes systems and processes for providing recommendations to users based at least in part on location data derived from those users and one or more personas that are associated with those users. More particularly, the systems and processes described herein may monitor the physical locations in which users have visited and identify patterns that indicate the places that the users most frequently visit. The systems and processes described herein may also create one or more personas that indicate a certain type of behavior that may be exhibited by users, and that may relate to various places or locations that are associated with particular users. Based at least in part on the location patterns that are determined for the users, the users may be assigned, classified, or tagged with one or more of the personas. Furthermore, depending upon the persona(s) that are associated with various users, the systems and processes described herein may provide one or more recommendations that are likely to be relevant to those users. In some embodiments, the recommendations may relate to deals, individuals, or any other information that are likely to be of interest to the users.

In various embodiments, location data that may indicate a current physical location of users, or physical locations in which the users were previously located, may be collected. The location data may be collected in any manner and may be collected over the course of days, weeks, and even years in order to determine location patterns associated with the users. That is, the places in which users visit, including the time of day, day of the week, frequency, or duration associated with those visits, may be collected in order to determine the places that those users typically visit, and when those places are typically visited. As a result, patterns that indicate when and where the users travel may be established.

In additional embodiments, various personas may be created that each correspond to different types of location or behavior patterns that may be exhibited by users. More particularly, each of the personas may correspond to types of activities that may be performed by a group of users or locations that may be visited by that group of users. For example, various personas may relate to stay-at-home parents, persons that commute a certain distance to work, persons that travel for various reasons, or persons that like a certain type of cuisine. Once these personas have been established, the location patterns determined for various users may be mapped to the personas. As a result, each persona may include a subset of particular users and each user may be assigned to, associated with, or tagged with one or more of the personas. In some embodiments, the systems and processes described herein may determine which users exhibit location patterns that match the behavior associated with the different personas.

In other embodiments, the personas may be utilized to provide various types of recommendations to users. For example, since location patterns may be established based on the location data associated with the users, and the users may then be tagged with one or more of the personas, the systems and processes described herein may then provide targeted recommendations to different users. As a result, each user may receive recommendations that are relevant and that are likely to be of interest to each user. In various embodiments, the recommendations may include deals that promote products, services, events, etc., as described below in additional detail. Moreover, for a particular user, the recommendations may identify persons that are likely to share common interests with that user. Therefore, since the recommendations may introduce users to other users, the recommendations may allow users to expand their respective personal networks. Furthermore, the recommendations may provide any other information that is likely to be of interest to a particular user. For example, such information may include current events, identification of merchants, articles, etc.

The discussion begins with a section, entitled "Example Environment," describing a system for providing recommendations based on location data and personas associated with users. Next, the discussion includes a section, entitled "Location Data Based Recommendations," that describes a process for using location data and personas to provide recommendations to users. The discussion then moves on to a "Recommendations by the Content Server" section that describes different types of recommendations that may be provided by the content server. The discussion then includes a section, entitled "Example Processes," that illustrates and describes example processes for providing recommendations to users based one or more personas. Lastly, the discussion includes a brief "Conclusion".

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Example Environment

Figure 1:
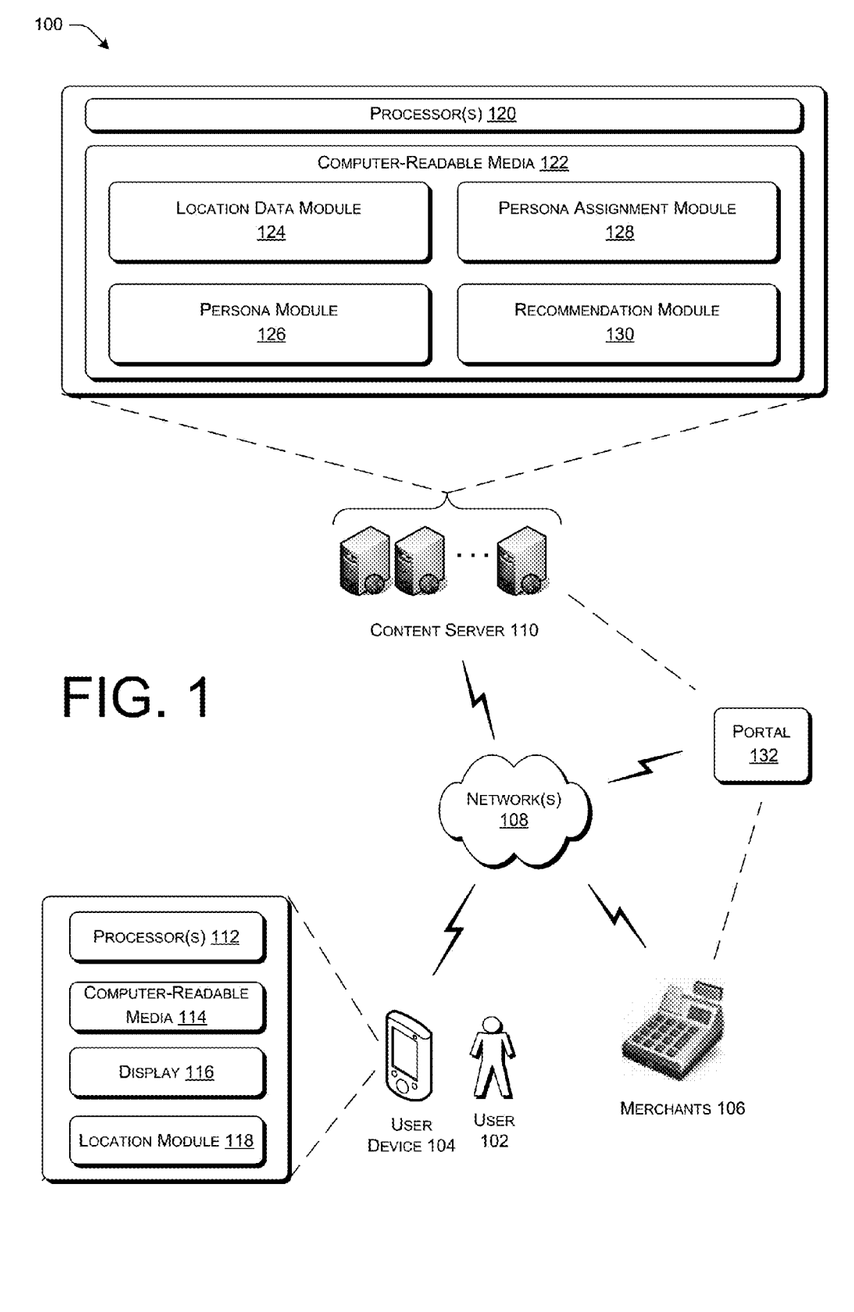
FIG. 1 is a diagram showing an example system including a user, a user device, one or more merchants, one or more networks, and a content server. In this system, one or more recommendations may be provided to users based at least in part on one or more personas associated with those users.

FIG. 1 illustrates an example system 100 for collecting location data associated with users and then providing recommendations to users based at least in part on one or more personas associated with those users. More particularly, the system 100 may include one or more users 102, one or more user devices 104 associated with the users 102, one or more merchants 106, one or more network(s) 108, and a content server 110. In various embodiments, the user 102 may operate the user device 104, which may include one or more processor(s) 112, computer-readable media 114, a display 116, and a location module 118. The content server 110 may also include one or more processor(s) 120 and computer-readable media 122, which may include a location data module 124, a persona module 126, a persona assignment module 128, and a recommendation module 130. The system 100 may also include a portal 132, which will be discussed in additional detail below.

In various embodiments, the content server 110 may be a service provider, a service, a deal sourcer, or any other server or entity that may monitor current or past physical locations (e.g., location data) of users 102. More particularly, the content server 110 may identify specific physical locations that are being visited by a user 102, such as by monitoring the physical location of a device (e.g., user device 104) that is in close proximity to the user 102. For instance, the content server 110 may determine the location of a mobile telephone, a PDA, a tablet device, etc., that is being carried by the user 102. As a result, since the specific physical location of the user 102 may be known, the content server 110 may determine which establishments, events, or merchants 106 (e.g., restaurants, stores, etc.) are being visited by the user 102 and the duration of time in which the user 102 is at that particular physical location. That is, the content server 110 may identify which establishments or merchants 106 correspond with those physical locations. The content server 110 may also identify patterns associated with each user 102 with respect to the locations that are most frequently visited. Furthermore, the content server 110 may monitor, collect, and maintain this location data for any number of users 102.

Once the location data has been collected, the systems and processes described herein may utilize the location data to determine location patters for the different users 102 and to establish one or more user location personas (hereinafter referred to as "personas") that may be associated with those users 102. More particularly, each user 102 may suggest or indicate various patterns based on where they travel, which places they visit, what things they are doing, the duration spent doing these activities, and the time of day or day of the week in which these activities occur. For instance, the location data may indicate location patterns consistent with a stay-at-home parent, a commuter who spends time at home and in the office, a frequent business traveler, a customer that eats at a particular restaurant more frequently than others, etc. Based at least in part on the location data, the content server 110 may cluster the location points for all or a subset of users 102 to define frequently visited areas. In some embodiments, the clusters may be associated with the duration in which users 102 stay at those areas, the time of day in which those areas are visited, and the frequency of visits at each area. If the clusters are relatively narrow, those areas may be associated with a particular workplace, merchant 106, school, home, etc. As a result, location patterns that indicate where users 102 are spending their time may be determined.

Moreover, the content server 110 may establish one or more personas that may represent location or behavior patterns that may be exhibited by the users 102. In some embodiments, the personas may relate to geographic regions in which users 102 live, work, or visit. In other embodiments, the personas may relate to particular merchants 106 or categories of merchants 106 that are visited by users 102. The personas may also represent varying lifestyles of users 102, such as stay-at-home parents, users 102 that telecommute from home, users 102 that commute between home and work, frequent travelers (for either business or personal reasons), college students, and any other types of patterns or behaviors that may be exhibited by users 102. In some embodiments, the personas may also be created based on the different location patterns that are derived from the location data.

In addition, the content server 110 may identify which users 102 exhibit location patterns that match the one or more personas. For instance, if the location data indicates that a particular user 102 is a stay-at-home parent, the content server 110 may determine that that user 102 matches a persona that corresponds with that behavior. In certain embodiments, the content server 110 may submit one or more queries to determine which customers (e.g., users 102) match the behaviors associated with the different personas. The queries may contain fields such as the number of clusters, distances between clusters, frequency of visits to clusters, information about the location or cluster, or any other type of information that can be used to determine whether certain user behaviors are consistent with different personas. Moreover, after extracting sets of users 102 that match or are consistent with the behavior or patterns associated with the personas, those users 102 may be assigned to, or tagged or associated with one or more personas that describe that location behavior.

Once the users 102 are tagged with one or multiple personas, the content server 110 may provide targeted recommendations to different users 102. That is, each user 102 may receive recommendations that are likely to be of interest to that particular user 102. For instance, stay-at-home parents might receive recommendations that are relevant to parents whereas college students may receive recommendations that are relevant to that particular demographic (e.g., ages 18-22). In various embodiments, the recommendations may include any type of information that is relevant to the persona(s) in which certain users 102 are associated with. For example, the recommendations may include deals that promote certain products or services. Alternatively, the content server 110 may recommend other users 102 that are likely to share common interests with a particular user 102. That is, for a user 102 that is associated with a particular persona, the content server 110 may identify other users 102 that are also within that persona. As a result, users 102 may be provided the opportunity to meet new people that are likely to have similar interests, habits, or lifestyles. The recommendations may also identify news, current events, social events, or any other information that is believed to be relevant to the different personas.

In some embodiments, the user 102 may operate the user device 104 to perform various functions associated with the user device 104, which may include the one or more processor(s) 112, the computer-readable media 114, the display 116, and the location module 118. Furthermore, the user 102 may utilize the user device 104 acquire items (e.g., products, services, etc.), to check into a particular place (e.g., a merchant 106), to begin or complete a transaction, to associated with a merchant 106, to access an application associated with the user device 104, or to perform some other action with respect to a physical location. In other embodiments, the location data may be obtained without the user 102 having to utilize the user device 104, with the exception of carrying the user device 104 while the user 102 is visiting different places or events (e.g., work, home, restaurants, stores, social events, etc.).

In some embodiments, the user device 104 may be any type of device that is capable of transmitting location data to the content server 110 or that may otherwise allow the content server 110 to obtain location data corresponding to a previous or current physical location of the user device 104. For instance, the user device 104 may include a personal computer, a laptop computer, a cellular telephone, a PDA, a tablet device, an electronic book (e-Book) reader device, or any other device that may be used to indicate its previous or current physical location or that may allow the content server 110 to determine this information. Moreover, the user 102 may utilize the user device 104 to access the network(s) 108. For instance, the user 102 may utilize the user device 104 to provide some indication that the user 102 is currently at a particular place or event. For instance, the user 102 may check into a particular place (e.g., merchant 106), conduct a transaction with a merchant 106, interact with an application associated with the user device 104, or otherwise indicate a current geographic location in which the user device 104 is located. Further, the user device 104 shown in FIG. 1 is only one example of a user device 104 and is not intended to suggest any limitation as to the scope of use or functionality of any user device 104 utilized to perform the processes and/or procedures described herein.

The processor(s) 112 of the user device 104 may execute one or more modules and/or processes to cause the user device 104 to perform a variety of functions, as set forth above and explained in further detail in the following disclosure. In some embodiments, the processor(s) 112 may include a central processing unit (CPU), a graphics processing unit (GPU), both CPU and GPU, or other processing units or components known in the art. For instance, the processor(s) 112 may allow the user device 104 to perform any action that allows the content server 110 to derive location data associated with the user device 104. Additionally, each of the processor(s) 112 may possess its own local memory, which also may store program modules, program data, and/or one or more operating systems.

In at least one configuration, the computer-readable media 114 of the user device 104 may include any components that may be used to transmit or otherwise indicate its previous or current physical location to the content server 110. Depending on the exact configuration and type of the user device 104, the computer-readable media 114 may also include volatile memory (such as RAM), non-volatile memory (such as ROM, flash memory, miniature hard drive, memory card, or the like), or some combination thereof.

In various embodiments, the user device 104 may also have input device(s) such as a keyboard, a mouse, a pen, a voice input device, a touch input device, etc. The user device 104 may also include the display 116 and other output device(s), such as speakers, a printer, etc. The user 102 may utilize the foregoing features to interact with the user device 104, the merchants 106, and/or the content server 110 via the network(s) 108. More particularly, the display 116 of the user device 104 may include any type of display 116 known in the art that is configured to present (e.g., display) information to the user 102. For instance, the display 116 may be a screen or user interface that allows the user 102 to interact with the merchants 106 or the content server 110, that allows the user 102 to indicate a current or past physical location, or that allows the content server 110 to obtain location data associated with the user device 104.

Additionally, the location module 118 of the user device 104 may include any mechanism that allows the user device 104 to convey location data to the content server 110 or that allows the content server 110 to obtain location data relating to the user device 104. For the purposes of this discussion, location data may refer to any type of data that enables the content server 110 to determine a current or past physical location of the user device 104. In some embodiments, the location module 118 may allow users 102 to perform some user actuation that indicates the current physical location of the user device 104. For instance, the location module 118 may enable users 102 to check into a particular merchant 106, to engage in a transaction or some other information exchange with the merchant 106, to interact with an application associated with the user device 104, or to perform any other action that indicates the current or past physical location of the user device 104. If a particular user device 104 becomes known to a merchant 106, that merchant 106 may transmit that data to the content server 110 or the content server 110 may otherwise obtain the location data from the merchant 106.

Alternately, or in addition, the location module 118 may allow the content server 110 to obtain location data associated with the user device 104. For example, the location data may be obtained by the content server 110 passively without any action being performed by the user 102. In some embodiments, the location data may be obtained via global positioning system (GPS) technology, cell tower triangulation, or any other manner that can be used to identify the physical location of the user device 104. That is, even if the user 102 is not performing any action with respect to the user device 104, the content server 110 may nonetheless obtain location data from the user device 104 that indicates the current or past physical locations of the user device 104. In some embodiments, the user device 104 may include an application or an application programming interface (API) that somehow enables the content server 110 to obtain the location data.

In various embodiments, the one or more merchants 106 may be any individual or entity that is associated with a physical location that may be visited or experienced by users 102. The merchants 106 may also represent various locations or events that may be visited by users 102. For instance, the merchants 106 may relate to entertainment, food, shopping, events, etc., as described above. That is, the merchants 106 may include or represent sporting events, social events, concerts, movies, restaurants, retail stores, shops, hotels, bars, nightclubs, museums, and/or any other place or event that may be visited and experienced by users 102. The merchants 106 may allow the users 102 to acquire items (e.g., products, services, etc.), to check into the merchant 106 if the users 102 are currently visiting a particular merchant 106, or to otherwise interact with the merchant 106. The merchant 106 may also allow the content server 110 to obtain location data associated with the user device 104 of a particular user 102 in order to derive the current or past physical location of the user 102.

That is, the places or events that may be visited by users 102 may be associated with one or more merchants 106. In other embodiments, other physical locations visited by users 102 may corresponds to a user's 102 home, workplace, school, homes of other users 102, or any other place that may be frequented by a particular user 102. The location data may indicate the frequency in which the places or events are visited, the duration in which the user 102 remains at these places or events, and the times or days of the week corresponding to when the user 102 visits these places or events.

In some embodiments, the network(s) 108 may be any type of network known in the art, such as the Internet. Moreover, the user device 104, devices associated with the merchants 106, and the content server 110 may communicatively couple to the network(s) 108 in any manner, such as by a wired or wireless connection. The network(s) 108 may also facilitate communication between the user device 104, the devices associated with the merchants 106, and the content server 110, and also may allow for the transfer of location data or communications therebetween. For instance, the content server 110 may obtain location data associated with the user devices 104 from the user devices 104 themselves or from one or more merchants 106. Further, recommendations that are provided from the content server 110 to the users 102 may be transmitted through the network(s) 108.

In addition, and as mentioned previously, the content server 110 may include the one or more processor(s) 120 and the computer-readable media 122, which may include the location data module 124, the persona module 126, the persona assignment module 128, and the recommendation module 130. The content server 110 may also include additional components not listed above that may perform any function associated with the content server 110. In various embodiments, the content server 110 may be any type of server, such as a network-accessible server. The content server 110 may also be any type of entity that obtains location data associated with various user devices 104 in order to determine a physical location of the users 102, and uses that location data to provide recommendations to the users 102. In other embodiments, the processor(s) 120 and the computer-readable media 122 of the content server 110 may be the same as, similar to, or different from the processor(s) 112 and the computer-readable media 114, respectively, of the user device 104.

In various embodiments, the location data module 124 of the content server 110 may obtain location data that indicates a previous or current physical location of the user devices 104 associated with the users 102. That is, the location data module 124 may obtain location data that may represent what users 102 are doing, where the users 102 have currently been, and/or where the users 102 are currently located. The location data may be provided by the user 102 via the user device 104 or it may be obtained by the location data module 124 in a passive manner. For instance, the location data may be obtained from the user device 104 via GPS technology, cell tower triangulation, or any other method of determining a physical location of the user device 104. Once obtained, the location data module 124 may maintain the location data for each user device 104, such that the location data module 124 may be aware of previous physical locations and current physical locations of each user device 104.

Furthermore, the location data module 124 may store known physical locations of the merchants 106 and other places or events. For instance, the location data module 124 may maintain a list that identifies where certain places (e.g., restaurants, stores, bars, schools, businesses, homes, workplaces, etc.) and events (e.g., sporting events, concerts, social events, etc.) are physically located. Based at least in part on the actual time, day of the week, or duration in which each user 102 was at each physical location, the location data module 124 may determine the particular place or event where each user 102 has been. For example, if the user 102 was at a certain physical location at a particular time, the location data module 124 may determine that the user 102 was visiting a particular restaurant or store, for instance. Additionally, if a user 102 is typically at a first location during the day on weekdays and then is at a second location during the evenings, nights, and weekends, the location data module 124 may infer that the first place is the user's 102 workplace and the second place is the user's 102 home. As a result, the location data module 124 may identify, with a relative high degree of confidence, which places or events each of the users 102 have visited.

Based at least in part on the location data associated with the different users 102, the location data module 124 may identify location patterns that indicate where the users 102 are going and what those users 102 are doing. That is, the location data module 124 may determine the places or locations that are most frequently visited by the users 102. In addition, the patterns may indicate times of day, days of the week, the frequency, and duration of stay, associated with each location that the users 102 visit. As a result, the location data module 124 may infer different types of information about each user 102. For example, the location data module 124 may determine that a first user 102 is a stay-at-home parent that stays home a majority of the time, that a second user 102 is a individual that commutes between home and the workplace, or that a third user 102 frequently travels for either work or for personal reasons.

The persona module 126 may create and/or maintain multiple personas that are representative of location patterns or behaviors that may be exhibited by the users 102. These personas may be determined based on the location data or the location patterns derived from the location data. For instance, if the persona module 126 determines that a relatively large subset of users 102 visits a particular location or engages in a certain type of behavior, the persona module 126 may establish a persona that is consistent with that behavior. The personas may also have varying degrees of specificity. For example, one persona may relate to more general user location patterns/behaviors, such as stay-at-home parents or users 102 that travel for business reasons, while other personas may be more specific (e.g., users 102 that eat at a particular restaurant on a particular day of the week). Moreover, the persona module 126 may add, remove, or modify personas at any time for any reason. For instance, certain personas may be modified over time based on changing user 102 behaviors with respect to the places that those users 102 visit.

In additional embodiments, the persona assignment module 128 may assign one or more personas to the different users 102 or may assign the user 102 to the different personas. That is, based at least in part on the location patterns that correspond to each user 102, the persona assignment module 128 may tag or associate those users 102 with one or more personas. In various embodiments, the location patterns or behaviors that are associated with a particular user 102 may be consistent with those associated with the one or more personas that are assigned to that user 102. As a result, the users 102 may be categorized based at least in part on the locations that those users 102 visit, the times and days in which each location is typically visited, the duration of stay at each location, and/or the frequency in which the users 102 visit those locations.

The recommendation module 130 may provide one or more recommendations to the users 102. More particularly, the recommendations that are provided to users 102 may be based at least in part on the personas(s) that are associated with those users 102. For instance, a certain group of users 102 that have been tagged with a first persona may receive a first recommendation, whereas a different group of users 102 that are tagged with a second, different persona may receive a second, different recommendation. As a result, since the personas may reflect location patterns associated with the users 102, the recommendations that are transmitted are more likely to be of interest to those users 102. In various embodiments, any type of information may be included in the recommendations and the recommendations may be provided to the users 102 in any manner, such as via a website, e-mail messages, text messages, telephone calls, social networks, a user device 104 associated with the user 102, etc.

In some embodiments, the recommendations may include deals that promote products, services, events, etc., that are believed to be of interest to the users 102 that receive the recommendations. That is, the deals that are provided to the users 102 may relate or be relevant to the personas in which the users 102 are associated with. For instance, if one or more users 102 are tagged with a persona that relates to stay-at-home parents, the deals that are provided to those users 102 may relate to products and/or services that relate to children (e.g., diapers, books, toys, etc.). Alternatively, for users 102 that are associated with a persona relating to frequent travelers, the deals may relate to hotels, airline tickets, etc. Accordingly, the deals that are provided to the users 102 may be targeted based at least in part on the personas in which they are associated with.

For the purposes of this discussion, the content server 110 may offer deals on behalf of itself, the merchants 106, and/or a deal sourcer that may be acquired by one or more consumers (e.g., user 102). In various embodiments, a deal sourcer may include any entity that aggregates deals from any number of merchants 106 and provides those deals to an entity, such as the content server 110, which may then offer those deals. Furthermore, the deals may represent some form of value to be applied when items are acquired by individuals in association with the deals, such as a discount, a credit, a rebate, and the like. The deals may also represent an offer and/or promotion to acquire one or more items associated with the deals. The items offered in association with the deals may include tangible items, intangible items, products, goods, services, a bundle of items, digital goods, digital services, events, and the like. The items provided by merchants 106 or the content server 110 and then offered by the content server 110 may be acquired by the users 102 via one or more physical locations, via one or more sites (e.g., a site of the merchant 106, an online retailer site, websites, etc.), via any type of user device 104, at the point of a transaction or interaction with a merchant 106, or combinations thereof. The merchants 106 and/or content server 110 may also provide items acquired by individuals to locations specified by the individuals, such as via mobile services, delivery, etc. In addition, the acquisition of items from merchants 106 by individuals via the content server 110 may be achieved through various means of providing value for the items, such as purchasing items, renting items, leasing items, borrowing items, trading items, bartering items, etc.

In additional embodiments, the recommendations may identify or reference other users 102 that are believed to have similar interests to the users 102 that receive the recommendations. For instance, if it is determined that multiple users 102 are each associated with a particular persona, the recommendation module 130 may identify those users 102 to other users 102 within that persona. As a result, the recommendations may allow users 102 to meet new people and possibly expand their respective personal networks. In various embodiments, the content server 110 may seek permission of the users 102 before the identity of those users 102 are revealed to other users 102.

The recommendations provided by the recommendation module 130 may also relate to any other type of information that is relevant to the persona(s) that are associated with the users 102. For instance, the recommendations may relate to current events, published articles, events, products, services, etc., that are likely to be of interest to users 102 or a subset of users 102 that are associated with a particular persona. Consequently, the recommendations that are provided by the recommendation module 130 may be targeted to users 102 based at least in part on the location patterns associated with the users 102 and the personas that are associated with or assigned to the users 102.

In additional embodiments, the portal 132 may be communicatively coupled to the network(s) 108 and may allow the merchants 106 and the content server 110 to interact with one another. For instance, the merchants 106 may access the portal 132 in order to exchange correspondence with the content server 110 or to submit deals that may eventually be provided to the users 102.

Location Data Based Recommendations

Figure 2:
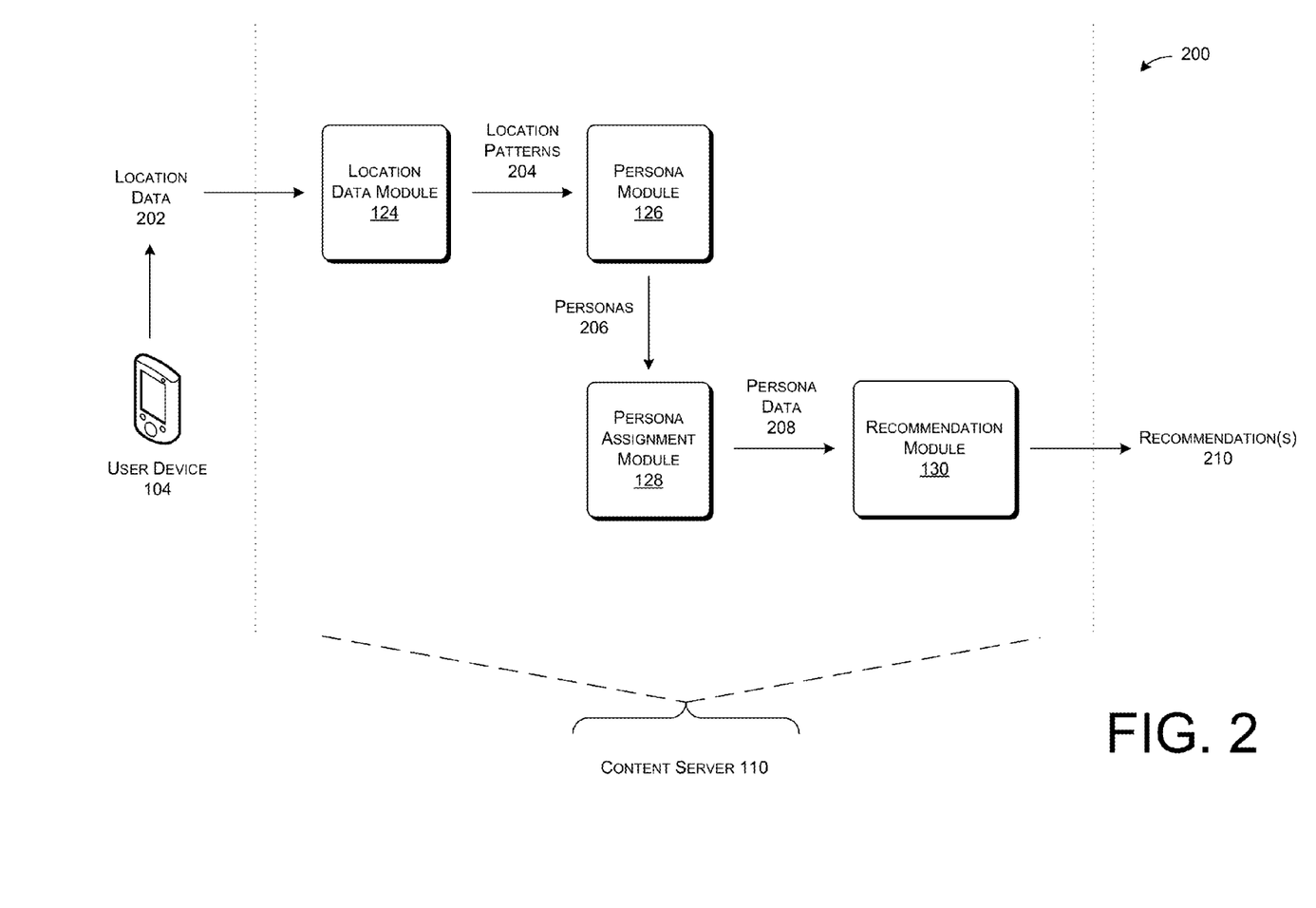
FIG. 2 is a diagram showing a process for providing recommendations to users based at least in part on location data associated with those users and one or more personas that are assigned to the users.

FIG. 2 illustrates a system 200 that represents a process for providing recommendations to users based on location data derived from devices associated with those users and personas associated with the users. More particularly, location data 202 may be identified for any number of user devices, such as user device 104, for example. A user 102 may carry such user devices 104 (e.g., mobile telephones, PDAs, tablet devices, e-Book reader devices, etc.) when the user 102 visits or is present at various places or events, such as home, work, restaurants, retail stores, sporting events, social events, etc. Therefore, the location data 202 may represent places or events where the user 102 was previously located or where the user 102 is currently located.

In various embodiments, the location data module 124 of the content server 110 may obtain the location data 202. More particularly, the location data module 124 may collect the location data 202 passively, meaning that the location data 202 may be obtained without the user 102 having to check into a particular place or otherwise taking any action. Instead, provided that the user 102 is carrying a user device 104 in which the content server 110 is able to monitor its physical location, the location data 202 associated with that user device 104 may be collected so long as the user device 104 is powered on. In various embodiments, the location data 202 may be obtained via GPS technology or cell tower triangulation, or the user device 104 may have an application that allows for the location data 202 to be collected by the content server 110. Moreover, the user 102 may need to opt in, such as by agreeing to certain conditions, before the content server 110 is able to collect the location data 202 associated with that user 102.

Furthermore, the location data 202 may be collected by the location data module 124 in any manner. For instance, and as stated above, the location data 202 associated with the user device 104 may be collected using GPS technology, cell tower triangulation, or any other manner known in the art. In some embodiments, the location data 202 may be obtained provided that the user device 104 is in the same physical location for a threshold amount of time, which may be any predetermined amount of time. In addition, the location data 202 may be obtained in response to some user actuation, such as the user 102 checking into a merchant 106, transmitting the location data 202 to the content server 110, or otherwise interacting with the user device 104.

In the above embodiments, a user 102 checking in or conducting a transaction with a particular merchant 106 may cause the generation of location data 202 that may be utilized by the location data module 124 to determine that the user 102 was visiting that particular merchant 106 at a certain time. Moreover, the content server 110 may maintain a list of merchants 106, places, events, etc., and their corresponding physical locations (e.g., a merchant taxonomy) and then map the location data 202 to the list. As a result, provided that the user 102 was visiting a merchant 106, the location data module 124 may be able to identify where the user 102 was actually located.

The users 102 may also explicitly provide the location data 202. For example, the users 102 may provide the physical locations associated with their home, workplace, and other places that the users 102 visit. Then, if the location data 202 indicates that a particular user 102 is in relative close proximity to those places (e.g., within a threshold distance), the location data module 124 may infer that the user 102 is or was actually located at those locations (e.g., home, work, etc.). In additional embodiments, the location data 202 may be derived from an address book associated with a user 102. For instance, provided that the user 102 authorizes the content server 110 to access an address book, the location data module 124 may identify locations or places that are frequently visited by that user 102.

Moreover, the location data 202 may be collected via one or more applications or APIs associated with the user device 104, a merchant 106, or a third party. In some embodiments, the location data 202 may be provided to the content server 110 in response to the user 102 interacting with any type of application that is associated with the user device 104, and that is able to determine a physical location of the user 102. For instance, applications may be utilized for the purpose of conducting a transaction, paying for a product or service, or checking the price of a product or service. Moreover, an application associated with a merchant 106 may be able to identify various user devices 104 when they are in relative close proximity, or when the user 102 interacts with a device associated with the merchant 106. As a result, the physical location of the user device 104 may be provided by, or collected from, these applications. The location data 202 may also be directly provided by the merchants 106 or other third parties. For example, the location data 202 associated with a user 102 may be provided as a result of the user 102 utilizing a credit card or providing information relating to a corresponding user device 104.

In further embodiments, the location data module 124 may collect the location data 202 via one or more social networks, such as websites associated with those social networks or from users 102 that utilize those networks. For example, if a particular user 102 shared a current or past physical location with their contacts, this information may form the basis of the location data 202. Alternatively, the location data 202 for a certain user 102 may be inferred based at least in part on the physical locations of that user's 102 friends or related users 102. For instance, if the location data module 124 determines that a significant number of users 102 are or were at a particular place or event, the location data module 124 may infer that similar or related users 102 (e.g., friends, contacts, etc.) may also be at that location.

In other embodiments, based on the location data 202 that is collected, the location data module 124 may determine which place, merchant 106, event, etc., the user 102 is visiting or previously has visited. In particular, and as stated above, the location data module 124 may maintain a list or database of known merchants 106, places, events, workplaces, homes, etc., and their corresponding physical locations that users 102 may visit. This list may be updated over time to help ensure that the list is current. When the location data 202 is collected, the location data module 124 may access this list to determine where the users 102 visited or what the users 102 were actually doing. The location data module 124 may also associate a time of day or a day of the week (e.g., timestamps, etc.) with the location data 202, where the timestamp may indicate a date and/or time that the user 102 was at the physical location associated with the location data 202. The timestamps may be utilized to help identify the specific merchant 106, place (e.g., home, work, etc.), event, etc., that a user 102 was visiting at a particular time. For instance, in an urban area where multiple merchants 106 are situated in close proximity to the same physical location (e.g., a mall, a multi-floor shopping area, etc.), it may be difficult to determine which merchant 106 a user 102 was visiting. However, if a timestamp associated with the location data 202 indicated that the user 102 was present at that physical location at 1:00 am, it may be more likely that the user 102 was at a nightclub, as opposed to a retail store.

In other embodiments, the duration of time spent in a particular physical location or the amount of time spent between physical locations may suggest where the user 102 is actually visiting. For instance, the location data module 124 may infer that the user 102 is shopping if the location data 202 indicates that the user 102 stays in one physical location for a short amount of time, and then moves to a different physical location for a short amount of time. Similarly, if the location data 202 is consistent with a physical location associated with a restaurant, and the user 102 stays at that physical location for one to two hours, the location data module 124 may determine that the user 102 is eating at that restaurant. Moreover, the location data module 124 may conclude that the user 102 is likely at work if the location data 202 suggests that the user 102 is in the same physical location for eight hours, and that the user 102 typically frequents that physical location on weekdays. Alternatively, the location data module 124 may determine that the user 102 is at home if the user 102 is consistently at that location during the evenings, the night, or over the weekend.

The location data module 124 may specify duration thresholds for determining whether a user 102 was at a place or event. That is, if the user 102 was present at that location for a duration of time that exceeds the threshold, the location data module 124 may infer that the user 102 was actually at that location. The duration thresholds may also vary based on the amount of time users 102 typically spend at certain places. For instance, the threshold amount of time for a workplace (e.g., four hours) may be greater than the threshold for a restaurant (e.g., one hour).

In addition, the duration of time in which a user 102 spends at a location may be determined in different manners. In some embodiments, multiple location points that each correspond to the user's 102 location at different times may be used to determine the times in which the user 102 was present at various locations. Moreover, location data 202 may be transmitted periodically and may be time stamped so that the location data module 124 may continuously monitor the current location of the user 102. The user 102 may also provide information that indicates where the user 102 was or is currently located and the duration of time that the user 102 spent at that location. Furthermore, the location data module 124 may monitor multiple user devices 104 (e.g., mobile phone, laptop computer, tablet device, etc.) associated with a user 102 to create different location points that represent a location of the user 102 when he/she utilized the different user devices 104.

Moreover, the location data module 124 may identify what the user 102 is actually doing or where the user 102 is going based on historical data. For example, if the location data 202 associated with a particular user 102 is in close proximity to a place or event that the user 102 has previously visited, the location data module 124 may infer that the user 102 is visiting that same place or event. In various embodiments, the location data module 124 may make this determination if the user 102 is within a predetermined distance (e.g., 50 feet, 100 feet, etc.) from that place or event. Therefore, the specific place or event that the user 102 is visiting may be identified without the user 102 needing to perform some action that identifies the place or event where the user 102 is currently located.

Once the location data 202 has been collected for the users 202, location patterns 204 associated with each user 102 may be established. In various embodiments, the location patterns 204 may correspond to places that each user 102 typically visits or is situated. For instance, the location patterns 204 for a particular user 102 may indicate the places that the user 102 most frequently visits (e.g., home, work, merchants 106, etc.), the times and days of the week in which those places are typically visited, the frequency of visits, and the duration of those visits. As a result, the location patterns 204 may allow the content server 110 to determine different behaviors of the users 102, such as where the users 102 are going, and when, on a daily, weekly, monthly, or yearly basis.

As stated above, the persona module 126 may create and/or maintain one or more personas 206 that correspond to location patterns 204 and behaviors that could be exhibited by users 102. In some embodiments, the personas 206 may be generated based at least in part on the location patterns 204 provided by the location data module 124. For instance, based on the location patterns 204, the persona module 126 may identify categories that represent behaviors or location patterns 204 that are typically associated with different groups of users 102. In some embodiments, the personas 206 may be suggested by the users 102, and may include personas 206 that were not contemplated or that are different from the personas 206 established by the persona module 126. Moreover, the persona module 126 may establish personas 206 if the location patterns 204 indicate that a threshold number of users 102 would be included within those personas 206. These thresholds associated with the personas 206 may vary so that the personas 206 may be granular, meaning that the some personas 206 may encompass a large number of users 102 while other personas 206 may relate to a much smaller group of users 102.

Therefore, the personas 206 may each represent a category that may be assigned to the users 102 based on their respective location patterns 204, which may be deduced from the location data 202 that is gathered over time for each user 102. The personas 206 may relate to a location density of a user 102, which may indicate the amount of time that the user 102 spends in a given location. For instance, a user's 102 location is more dense at home and at work if that user 102 spends a majority of their time in those two locations.

Although any number of personas 206 may be established, the following are examples of personas 206 that may be created by the persona module 126. A "single-point" persona 206 may indicate that the user's 102 time may be densely centered around a single location (e.g., home), and that the user 102 infrequently travels far outside that single location. Moreover, A "single-point plus errands" persona 206 may represent that most of the user's 102 time is densely centered around a single location (e.g., home), but that the user 102 has specific places that the user 102 travels to regularly, which may include a grocery store, restaurants, homes of family and friends, etc. Furthermore, a "single-point plus evening-outings" persona 206 may indicate that most of the user's 102 time is densely centered around one location, but that the user 102 sporadically travels to different locations during the evenings. Additionally, a "bi-modal" or "tri-modal" (and so on) persona 206 may represent that a majority of the user's 102 time is densely centered around two or three locations, respectively, and possibly only those locations. For instance, a "bi-modal" persona 206 may indicate that a user 102 spends most of his/her time at two different locations, such as home and work. In some embodiments, the "bi-modal" and "tri-modal" personas 206 may be further classified based on the times in which the users 102 are typically at those locations. For example, a persona 206 may be identified as "bi-modal point A mornings, point B evenings" to indicate that the user 102 typically spends their time at one location in the mornings (e.g., point A) and at a different location in the evenings (e.g., point B).

It is contemplated that any other personas 206 may be created, and the personas 206 may possibly be more specific. For instance, such personas 206 may relate to the frequent business traveler who commutes on a weekly basis, the stay-at-home parent, a commuter who travels between home and work, a person who eats lunch at the same location each day, college students, etc. As a result, the persona module 126 may create multiple different personas 206 so that the users 102 may be classified in a particular manner.

The persona module 126 may also establish personas 206 utilizing one or more algorithms, such as a machine learning algorithm or other machine learning methods. More particularly, the content server 110 may identify certain location patterns 204 associated with a particular user 102 based on multiple location data points derived from a corresponding user device 104. However, these location patterns 204 may not match or be consistent with any preexisting or pre-defined personas 206. As a result, since the system 200 may elect not to assign any pre-defined personas 206 to the user 102, the algorithms may deduce one or more new personas 206 that reflect those location patterns 204. The new personas 206 may then be associated with that user 102, and perhaps only with that user 102.

In various embodiments, the personas 206 established by the persona module 126 may be utilized by the persona assignment module 128 in order to assign one or more of the personas 206 to each of the users 102, or vice versa. More particularly, the persona assignment module 128 may associate or tag each of the users 102 with one or more of the personas 206 when the location patterns 204 associated with the users 102 match the location behaviors that correspond to those personas 206. That is, when the places or events that a particular user 102 visits correspond to the expected type of behavior relating to a specific persona 206, that persona 206 may be associated with that user 102. Therefore, the users 102 may be characterized or categorized based on the location patterns 204 that have been derived for those users 102. As a result, the personas 206 may include a group of users 102 that are determined to have similar location patterns 204, which may indicate that those users 102 have visited the same or similar locations and possibly have common or similar interests. In certain embodiments, the correlations between the personas 206 and the users 102 may be referred to as persona data 208, and may be utilized by the recommendation module 130.

In some embodiments, the persona assignment module 128 may determine whether a user 102 is to be associated with one or more personas 206 based at least in part on thresholds relating to the personas 206. That is, in order for a user 102 to be tagged with a particular persona 206, a certain threshold or various conditions have to be first satisfied. These determinations may be made by one or more algorithms. Moreover, the persona assignment module 128 may associate the user 102 with a persona 206 if the location patterns 204 relating to the user 102 meet or exceed the threshold or conditions associated with that persona 206. If so, the user 102 may be tagged with that particular persona 206. For example, provided that this persona 206 refers to users 102 that commute between home and work, the conditions for qualifying for this persona 206 may relate to the user 102 spending a minimum amount of time at both home and work. In other words, if the user 102 spends at least a certain amount of time at work (e.g., eight hours per day overlapping noon) and a minimum amount of time at home (e.g., eight hours per day overlapping midnight), the persona assignment module 128 may associate that user 102 with that persona 206. That is, the content server 110 may monitor the location patterns 204 of users 102 and may add users 102 to a persona 206 when those users 102 satisfy the threshold relating to that persona 206.

In various embodiments, the personas 206 may be refined or modified by the persona assignment module 128 for any reason at any time. More particularly, the conditions or thresholds that are utilized to determine whether users 102 qualify for the personas 206 may be refined or modified. As a result, upon such changes being made, users 102 that are currently included in a particular persona 206 may be removed, while other users 102 that previously did not meet the conditions for qualifying for that persona 206 may now meet those conditions and thus be added to that persona 206. In other embodiments, changes in the location patterns 204 associated with the users 102 may cause users 102 to be added or removed from various personas 206. Therefore, the users 102 that are associated with a particular persona 206 may vary over time. Moreover, the number and type of personas 206 that are assigned to a particular user 102 may also vary.

The personas 206 that are assigned to a certain user 102 may have varying weights. That is, although multiple different personas 206 may be associated with that user 102, the personas 206 that appear to be more relevant to that user 102 may be assigned a greater weight. The weights may be based on current location patterns 204, which may indicate what the user 102 is actually doing. The weights may also be based on modified or new location patterns 204 that are determined from newly identified location data 202. For instance, if the location data 202 for that user 102 suggests new patterns relating to what that user 102 is doing or where that user 102 is going, the weights assigned to the personas 206 that are associated with that user 102 may be increased or decreased. Additionally, if the behavior of the user 102 changes abruptly or changes over a period of time, certain personas 206 may even be disassociated with the user 102, while other personas 206 may be newly associated with the user 102. Accordingly, as the content server 110 detects new location patterns 204 associated with a user 102, the personas 206 associated with the user 102 may change and the weights of the currently associated personas 206 may also vary. As a result, the content server 110 may be better able to continue to provide relevant recommendations 210 to users 102.

As stated above, the users 102 and personas 206 that correspond to one another may be referred to as persona data 208, which may then be utilized by the recommendation module 130. In various embodiments, the recommendation module 130 may provide one or more recommendations 210 to the users 102 via their respective user devices 104. The recommendations 210 may include any type of information that may be of interest to the users 102 that are to receive the recommendations 210. More particularly, the recommendations 210 may be directed to users 102 based at least in part on the personas 206 that the users 102 are associated with. Therefore, the recommendations 210 may be targeted to users 102 depending upon the location patterns 204 associated with those users 102. The recommendations 210 that are provided to a particular user 102 may also depend upon the weights assigned to the personas 206 that are associated with that user 102. For instance, the user 102 may receive additional recommendations 210 that relate to a persona 206 that has a higher assigned weight.

In some embodiments, the recommendations 210 that are provided to users 102 may be based at least in part on user 102 input, which may enable the content server 110 to provide recommendations 210 that are consistent with user preferences. For instance, users 102 may explicitly state that they visit certain locations (e.g., home, a workplace, various merchants 106, etc.), that they exhibit certain location patterns 204 (e.g., a commuter, stay-at-home parent, etc.), or the users 102 may identify other user preferences (e.g., likes, dislikes, etc.). Users 102 may also create new personas 206 or indicate that they should or should not be associated with various personas 206. Furthermore, users 102 may explicitly state that they prefer different types or forms of recommendations 210, or categories thereof, and that they tend to dislike other recommendations 210. As a result, based on information provided by users 102, the content server 110 may provide relevant recommendations 210 that are specifically targeted to individual users 102.

In various embodiments, the recommendations 210 may include one or more deals that are likely to be of interest to users 102. In particular, different deals or different categories of deals may be provided to different groups of users 102 depending upon which personas 206 are associated with those users 102. For example, users 102 that are determined to be stay-at-home parents may receive deals relating to children (e.g., diapers, babysitting services, etc.) whereas deals directed to commuters may relate to different products or services (e.g., discounts on gas, vehicles, etc.). Moreover, the deals may be provided to all users 102 that are associated with a particular persona 206 or a subset of those users 102. As a result, the recommendation module 130 may provide deals that are relevant to the recipients of those deals.

That is, since the location patterns 204 and the personas 206 for a particular user 102 may indicate when that user 102 will likely be at a particular location, the recommendation module 130 may target deals based on that location. For instance, if the location data 202 for that user 102 indicates that the user 102 typically eats at restaurants on Friday nights, the recommendation module 130 may provide that user 102 with a deal that includes a promotion for a restaurant on Friday night. Therefore, by predicting when users 102 will be at certain locations, the deals may be specifically targeted to each user 102 or to a group of users 102 associated with a particular persona 206. As another example, if is determined that a user 102 travels to a particular location (e.g., Seattle, Wash.) on a routine basis (e.g., every two months), the recommendation module 130 may provide appropriate deals to that user 102 when the user 102 is next expected to travel. That is, the recommendation module 130 may provide deals relating to Seattle, Wash. a certain time before that use 102 is expected to travel.

Moreover, since the location patterns 204 or the personas 206 associated with a particular user 102 may identify where that user 102 is most likely to be at a certain time, the recommendation module 130 may provide deals that are relevant to the user's 102 predicted current location. That is, the deals may be tailored to where the user 102 is typically located throughout the day. For example, if the user 102 is most likely at work, the deals provided to that user 102 may relate to a nearby restaurant that the user 102 may go to lunch.

In further embodiments, the deals may be targeted to the density of where users 102 spend most of their time. For example, if users 102 typically spend their time in a particular region, the recommendation module 130 may offer deals within that region or slightly outside that region. As a result, the recommendation module 130 may be recommending deals in which the users 102 are most likely to travel to and thus acquire. In addition, deals may be provided to users 102 based on their current physical location. For instance, if the location data 202 suggests that a particular user 102 is at a certain physical location, the recommendation module 130 may provide recommendations 210 that relate to the region in which the user 102 is located.

In addition to providing deals to users 102, the personas 206 may allow users 102 to meet or network with other users 102 that are likely to have similar interests. Since users 102 may be interested in networking with people that are interested in the same or similar activities or that are visiting the same or similar places, the users 102 may be interested in corresponding with other users 102 that are included within the same persona 206 that those users 102 are associated with. Therefore, the recommendation module 130 may allow users 102 to build or expand their respective social/personal networks based on the personas 206 that are assigned to each user 102.

In particular, provided that the users 102 have agreed to certain conditions, the recommendations 210 may inform users 102 that they are included in certain personas 206 based on their respective activities or locations that they visit. Moreover, the recommendations 210 may identify other users 102 that are also included in those same personas 206 and that are likely to share common interests. Therefore, the recommendation module 130 may allow the users 102 to meet people that have similar location patterns 204 and to learn that there are groups of other users 102 that they may be interested in knowing. For instance, the recommendation module 130 may inform the users 102 of what these people are doing, where they are going, etc. Therefore, as opposed to limiting interactions between users 102 in an online setting, the content server 110 may enable users 102 with similar or different interests to become acquainted in the real world.

The recommendations 210 may also relate to any other type of information that is likely to be of interest to various users 102. For example, the recommendations 210 may include information relating to current events, news, articles, events, products, services, etc., that may be different depending upon the location patterns 204 and persona(s) 206 associated with the users 102. As a result, the information that is provided to the users 102 may be relevant to each user 102.

Furthermore, new information, such as additional location data 202, new location patterns 204, or newly created personas 206, may cause or trigger downstream effects. For example, for a particular user 102, when additional location data 202 becomes available, the location patterns 204 associated with that user 102 may change, which may alter which personas 206 are associated with that user 102. Accordingly, the type of recommendations 210 provided to that user 102 may also change over time. Similarly, as additional personas 206 are established, certain personas 206 may be newly associated with the user 102 or currently associated personas 206 may be disassociated from that user 102. Again, since the recommendations 210 may be based partly on the personas that are currently associated with the user 102, the recommendations 210 provided to that user 102 may vary. When this new information becomes available, the content server 110 may update the location patterns 204, the personas 206, the assigned personas 206, or the recommendations at one time utilizing a batch computation process. The content server 110 may also update the foregoing incrementally as the new information becomes available, and possibly in combination with the batch computation process.

In various embodiments, based at least in part on a particular user's 102 location patterns 204 and/or personas 206, the content server 110 may determine whether that user 102 travels, either for business or for personal reasons. More particularly, the content server 110 may analyze the corresponding location data 202 to identify whether the user 102 travels frequently. If so, the content server 110 may further determine the frequency of travel, the locations in which the user 102 visits, whether the user 102 visits the same location on multiple occasions, the manner of travel (e.g., airplane, car, train, boat, etc.), and so on. Based on the user's 102 travel history, a travel persona 206 may be established or assigned to that user 102. As stated above, the travel history may be determined from the location data 202, which may be derived from a user device 104 (e.g., mobile phone, PDA, tablet device, e-Book reader device, etc.) associated with the user 102. In some embodiments, the user device 104 may be of a type that is frequently brought with the user 102 while the user 102 is traveling.

Based at least in part on the user's 102 travel persona 206, the recommendation module 130 may provide any type of deals or recommendations 210 that are relevant to the user's 102 travel history. For instance, the user 102 may receive deals or other types of information that relate to traveling between destinations (e.g., flights, bus travel, etc.), traveling within a destination (e.g., subway passes, taxis, limousines, etc.), products, services or promotions at the destination (e.g., local restaurants, local museums, tours, tickets, etc.), hotels, luxury items (e.g., social events, free room service, etc.), activities (e.g., shopping, hiking, etc.), and other items that may be relevant to that particular destination, such as clothing, luggage, or other travel-related accessories or items.

By knowing the user's 102 travel persona 206, the content server 110 may predict when the user 102 may be travelling, and to where. As a result, the content server 110 may provide appropriate deals to the user 102 prior to the user 102 actually departing for their intended destination. For instance, if the user's 102 travel history indicates that the user 102 travels to a certain location at the end of every month, deals that relate to that location may be provided to the user 102 before the user 102 actually goes to that location. Therefore, the user 102 may be provided the opportunity to acquire discounted items or items that have limited availability that are associated with the destination that the user 102 will be visiting. In other embodiments, relevant deals may also be provided to the user 102 while the user 102 is at that destination.

Furthermore, in various embodiments, the travel-related deals may be the primary deal provided to the user 102 if the content server 110 determines that the user 102 is at another location, aside from their normal location (e.g., home, work, etc.) or if the content server 110 has identified a repeated pattern of travel that suggests that the user 102 will be traveling in the near future. In contrast, the travel-related deals may be a secondary deal if the historical travel patterns associated with that user 102 indicate that the user 102 is likely to be traveling to that destination sometime in the future.

The systems and process described above with respect to FIG. 2 may also apply to other entities, such as merchants 106, delivery services, etc. Therefore, the location data 202 collected by the content server 110 may indicate where the merchants 106 typically spend their time. As a result, the merchants 106 may select certain groups of customers that are to receive deals relating to those merchants 106. In various embodiments, certain merchants 106 may prefer that local users 102 acquire their products or services, or those merchants 106 may prefer that users 102 that are more likely to be repeat customers are to receive their deals. As a result, the merchants 106 may cause the content server 110 to provide their deals to a limited number of consumers, such as users 102 that are include in specific personas 206.

Recommendations by the Content Server

Figure 3:
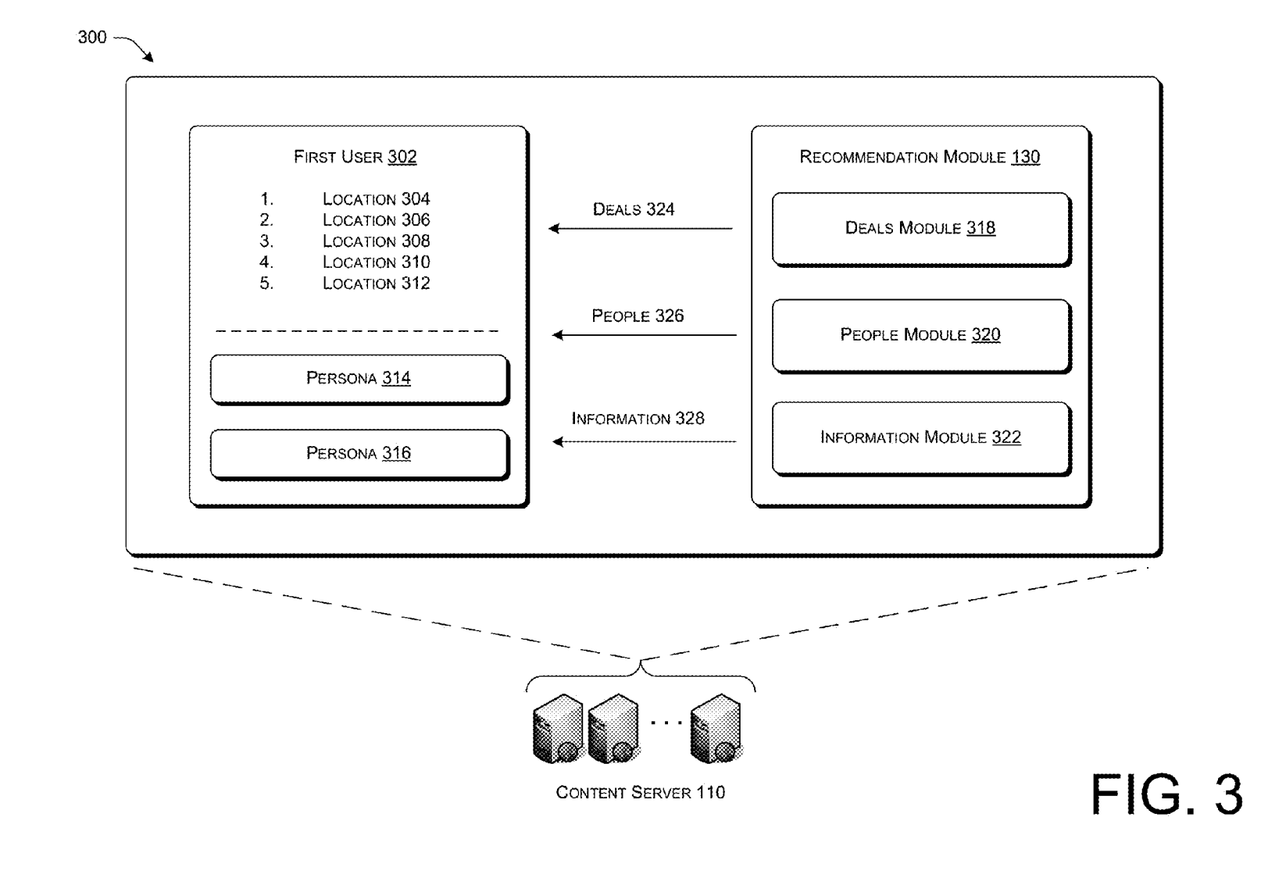
FIG. 3 is a diagram showing components associated with a content server that provides various recommendations to users based at least in part on one or more personas associated with those users.

FIG. 3 illustrates a diagram representing a system 300 for providing different types of recommendations to users based at least in part on personas assigned to those users. More particularly, as set forth above with respect to FIG. 2, the content server 110 may obtain location data 202 associated with one or more users 102, identify location patterns 204 that indicate when users 102 are typically traveling to different places or events, associate one or more personas 206 with each user 102, and then provide targeted recommendations 210 to the users 102 based on the particular personas 206 that have been assigned to each user 102. As a result, each user 102 may receive different recommendations 210 that are more likely to be of interest to that particular user 102.

As shown in FIG. 3, the content server 110 may include information about a first user 302 (or any number of users 102) and the recommendation module 130. In various embodiments, the content server 110 may obtain location data 202 associated with the first user 302, which may be represented as locations 304-312. Each of locations 304-312 may represent a particular physical location that was visited by the first user 302 (e.g., home, work, a merchant 106, events, etc.), and each of the locations 304-312 may be associated with a time of day, a day of the week, a duration of the visit, or frequency of visits. Therefore, based at least in part on the location data 202 (e.g., locations 304-312), the content server 110 may identify one or more location patterns 204 relating to the first user 302.

Based at least in part on the particular locations 304-312 visited by the first user 302 and the times in which the first user 302 visited those locations 304-312, the content server 110 may assign one or more personas 206 to the first user 302. For instance, the first user 302 may be associated or tagged with any number of personas, such as persona 314 and persona 316, as illustrated in FIG. 3. In various embodiments, the personas 206 assigned to the first user 302 (e.g., personas 314 and 316) may be representative of location patterns 204 that have been exhibited by the first user 302. For instance, one of the personas 314 and 316 may represent a commuter if the content server 110 determines that the first user 302 frequently travels between home and work. In other embodiments, a different one of the personas 314 and 316 may represent a frequent traveler if the location data 202 associated with the first user 302 indicates that the first user 302 frequently travels to the same or different destinations. Accordingly, the particular persona(s) 206 that are associated with the first user 302 (e.g., personas 314 and 316) may characterize or categorize the first user 302 based on when and where the first user 302 spends his/her time.

Once the content server 110 associates one or more personas 206 (e.g., personas 314, persona 316, etc.) with the first user 302, the recommendation module 130 may provide one or more targeted recommendations 210 to the first user 302. More particularly, based at least in part on the personas 206 in which the first user 302 is associated with (e.g., commuter, stay-at-home parent, etc.), the recommendation module 130 may provide recommendations 210 that are likely to be of interest to the first user 302. Moreover, the recommendation module 130 may include a deals module 318, a people module 320, and an information module 322. In various embodiments, the deals module 318 may provide one or more deals 324 to the first user 302, the people module 320 may identify one or more people 326 to the first user 302, and the information module 322 may recommend various types of information 328 to the first user 302. As a result, the first user 302 may receive varying types of recommendations 210 that are likely to be of particular interest to the first user 302.

In some embodiments, depending on the type of personas 206 associated with the first user 302, the deals module 318 may recommend one or more deals 324 that are likely to be of interest to the first user 302. For example, if persona 314 or persona 316 relate to stay-at-home parents, the deals module 318 may recommend deals 324 that relate to products or services related to children (e.g., diapers, toys, etc.). Further, provided that persona 314 or persona 316 relate to frequent travelers, the deals module 318 may provide deals 324 that relate to airfares, hotels, or activities associated with the destination that is to be visited. Accordingly, the deals 324 that are provided to the first user 302 may be targeted such that they are consistent with interests or preferences of the first user 302.

In addition, the people module 320 may identify one or more people 326 that are likely to share common interests with the first user 302. In various embodiments, these people 326 may be included in the same personas 206 in which the first user 302 is included, which may mean that the first user 302 and the people 326 visit the same or similar locations or do the same or similar things. As a result, the content server 110 may infer that the people 326 are likely to have interests similar to the first user 302. Provided that the people 326 have agreed that the content server 110 may reveal their respective identities, the people module 320 may identify these people 326 to the first user 302. The first user 302 may then contact, correspond with, meet, or include these people 326 in their own personal network. Therefore, the people module 320 may allow the first user 302 to meet new people 326 that are likely to share similar interests.

In other embodiments, the information module 322 may provide any type of information 328 to the first user 302 that is determined to be of particular interest to the first user 302. That is, based at least in part on persona 314 or persona 316 in which the first user 302 has been tagged with, the information module 322 may identify information 328 that may be relevant to the first user 302. For instance, the information 328 may include current events, news, articles, products, services, events, or any other type of information 328. Therefore, each user 102 (e.g., the first user 302) may receive recommendations 210 that are particularly tailored to specific user interests, locations visited by each user 102, and location patterns 204 that have been exhibited by each user 102. As a result, the content server 110 may provide recommendations 210 that are customized to each user 102 or to particular groups of users 102.

Example Processes

Figure 4:
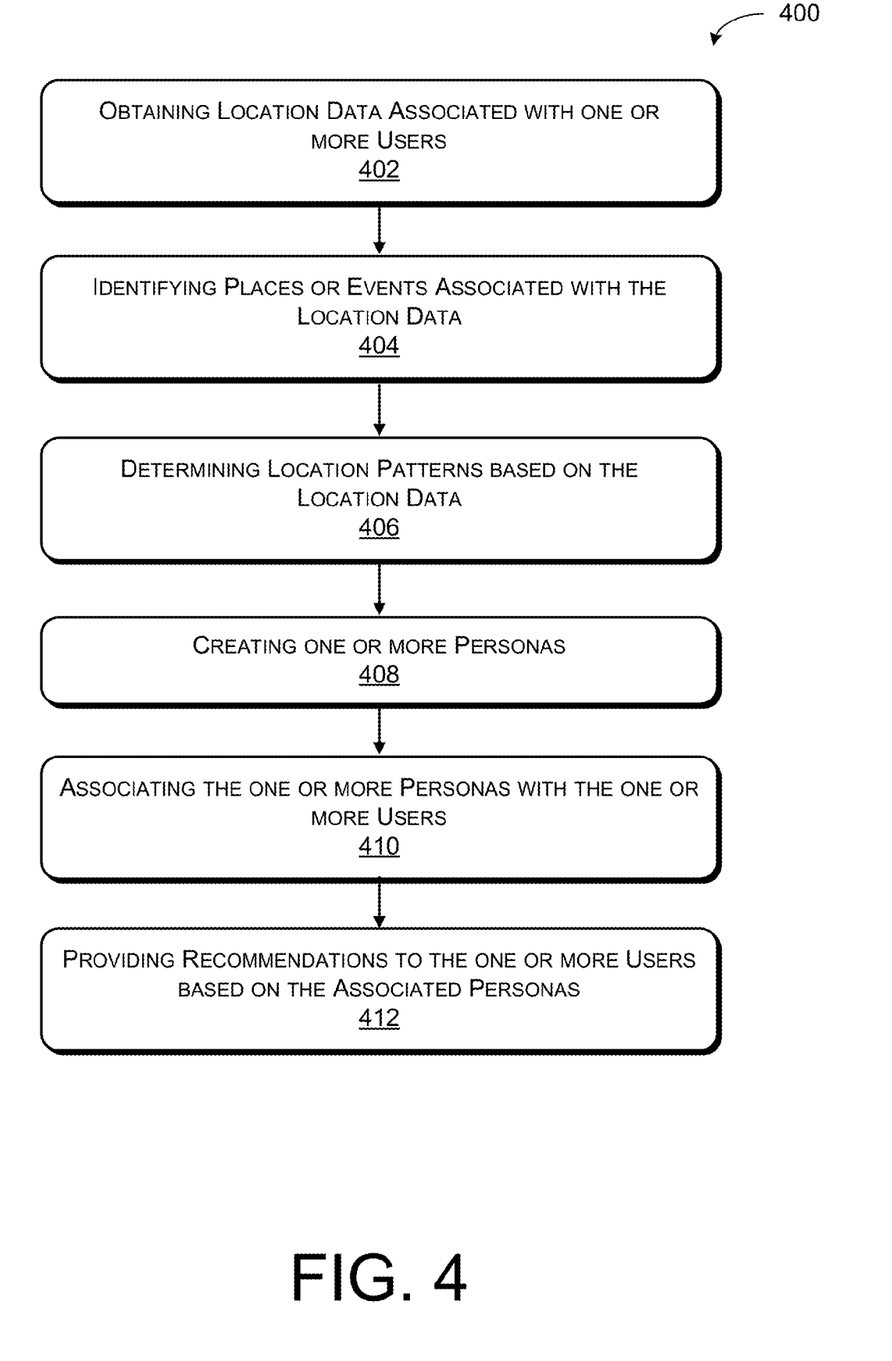
FIG. 4 is a flow diagram showing an example process of providing recommendations to users based at least in part on one or more personas.

FIG. 4 describes various example processes of providing recommendations to users based at least in part on personas associated with those users. The example processes are described in the context of the environment of FIGS. 1-3 but are not limited to those environments. The order in which the operations are described in each example method is not intended to be construed as a limitation, and any number of the described blocks can be combined in any order and/or in parallel to implement each method. Moreover, the blocks in FIG. 4 may be operations that can be implemented in hardware, software, or a combination thereof. In the context of software, the blocks represent computer-executable instructions stored in one or more computer-readable storage media that, when executed by one or more processors, cause one or more processors to perform the recited operations. Generally, the computer-executable instructions may include routines, programs, objects, components, data structures, and the like that cause the particular functions to be performed or particular abstract data types to be implemented.

FIG. 4 is a flow diagram illustrating an example process 400 of providing various recommendations to users based at least in part on personas that are assigned to or are associated with those users. Moreover, the following actions described with respect to FIG. 4 may be performed by the content server 110, which may be any type of server, a service provider, a deal sourcer, a merchant 106, etc., as shown in FIGS. 1-3.

Block 402 illustrates obtaining location data associated with one or more users. More particularly, the physical locations of one or more users (e.g., users 102) may be obtained via user devices (e.g., user devices 104) associated with those users. The location data may be obtained in any manner, such as, for example, via the user or one or more applications associated with the user device. Moreover, the location data (e.g., location data 202) may indicate a time of day or day of the week in which the user visited the different locations, duration of the visits, or the frequency of the visits. As a result, a content server (e.g., content server 110) may identify past and current locations of different users.

Block 404 illustrates identifying places or events associated with the location data. In various embodiments, although location data may be obtained, the actual places or events that are visited by the users may be unknown. Therefore, the content server may identify places or events (e.g., home, work, merchants 106, social events, travel destinations, etc.) that correspond to those physical locations. These places or events may be inferred based on historical data, data provided by the users, lists of known merchants and their corresponding physical locations, and the users' proximity to those locations. As a result, the content server may be able to identify the actual places that the users visited.

Block 406 illustrates determining location patterns based on the location data. In particular, based at least in part on the places and events that each user visits, including the times, duration, and frequency associated with those visits, the content server may determine location patterns (e.g., location patterns 204) for each of the users. The location patterns may indicate the behavior of users with respect to when and where the users typically spend their time. For example, the location patterns may correspond to a stay-at-home parent, a user that frequently travels to one or more destinations, or a user that commutes between home and work.

Block 408 illustrates creating one or more personas. Furthermore, the content server may create or maintain personas that represent various types of location behaviors or patterns that may be exhibited by users. Therefore, each of the personas may be a category that may define when and where certain users typically spend their time. The personas may vary in scope, size, and the number of users that are expected to be included in such personas.

Block 410 illustrates associating the one or more personas with the one or more users. In some embodiments, the content server may assign personas to users that match the location patterns exhibited by those users. For example, if the location patterns of a particular user indicate that the user is a stay-at-home parent, the content server may associate or tag the user with a "stay-at-home parent" persona. As a result, the one or more personas that are associated with users may represent categories of users that exhibit the same or similar types of behavior with respect to the places users visit and the things users do. Moreover, since the location patterns of users within the same persona may likely be similar, the users included within the same persona are likely to share common interests.

Block 412 illustrates providing recommendations to the one or more users based on the associated personas. In various embodiments, different recommendations may be targeted to different users based at least in part on the personas that are associated with those users. Accordingly, the recommendations may relate to information that is likely to be of particular interest to users. In certain embodiments, the recommendations may include any type of information, including deals, products, services, news, current events, articles, events, etc. Moreover, the recommendations may identify other users that are likely to have interests that are similar to the user that receives the recommendations. As a result, the user may utilize these recommendations to meet new people and expand their own personal network.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
memory;
one or more processors;
one or more modules maintained in the memory and executed on the one or more processors to:
obtain first location data corresponding to one or more first physical locations associated with a user device;
obtain, from one or more merchant devices, second location data corresponding to one or more second physical locations associated with a user associated with the user device;
determine location patterns associated with the user device based at least in part on the first location data and the second location data;
create a first persona that represents a first category of user behavior and a second persona that represents a second category of user behavior;
utilize the location patterns to associate the user device with the first persona; and
provide recommendations to the user device based at least in part on the user device being associated with the first persona, the recommendations identifying one or more other users not previously socially connected to the user, at least one other user of the one or more other users being identified based at least partly on the at least one other user being associated with the first persona.

2. The system as recited in claim 1, wherein the first location data is utilized to infer current or past physical locations of the user.

3. The system as recited in claim 1, wherein the user device is associated with the first persona by comparing the location patterns associated with the user device with the first category of user behavior and the second category of user behavior.

4. The system as recited in claim 1, wherein user device is associated with the first persona based at least partly on a determination that the location patterns associated with the user device meet a threshold associated with the first persona.

5. The system as recited in claim 1, wherein the one or more modules are executed on the one or more processors to:
   identify places or events that correspond to at least one of the first location data and the second location data;
   determine the location patterns based at least in part on the places or events; and
   associate the places or events with at least one of the first persona and the second persona based on location patterns of the at least one of the first persona and the second persona.

6. The system as recited in claim 1, wherein the location patterns correspond to at least one of:
   locations or places that are visited more frequently;
   times of day in which the locations or places are visited;
   days of a week in which the locations or places are visited;
   a frequency in which the locations or places are visited; or
   a duration of time in which the locations or places are visited.

7. The system as recited in claim 1, wherein:
   the recommendations include one or more deals; and
   the one or more deals are based at least in part on the first persona.

8. The system as recited in claim 1, wherein the recommendations identify at least one of a location or a location pattern.

9. The system as recited in claim 1, wherein the recommendations include information that is targeted to users that are associated with different personas of the at least one of the first persona and the second persona, the information comprising one or more of current events, news, articles, events, or services that are associated with at least one of the location patterns and the at least one of the first persona and the second persona.

10. The system as recited in claim 1, wherein the one or more modules are further configured to obtain third location data corresponding to a first physical location of the user device based at least partly on a second physical location of a second user device associated with a second user that is determined to be related to the user.

11. The system as recited in claim 1, wherein the second location data is provided by the one or more merchant devices based on the user utilizing a credit card in association with a merchant.

12. A method comprising:
   obtaining first location data that corresponds to one or more first physical locations associated with a user device;
   obtaining, from one or more merchant devices, second location data that corresponds to one or more second physical locations associated with a user, wherein the user is associated with the user device;
   determining location patterns of the user device based at least in part on the first location data and the second location data;
   associating at least one persona with the user device based at least partly on a determination that the location patterns relate to the at least one persona; and
   providing one or more recommendations to the user device, the recommendations including an identity of one or more other users, not previously connected to the user, wherein the one or more other users share the at least one persona and at least one location pattern of the location patterns.

13. The method as recited in claim 12, wherein the at least one persona represents one or more categories of location behavior that are exhibited by one or more groups of users.

14. The method as recited in claim 12, wherein the one or more recommendations are targeted towards the at least one persona such that multiple users associated with the at least one persona receive the one or more recommendations.

15. The method as recited in claim 12, wherein the one or more recommendations identify one or more deals that are determined to be relevant to the at least one persona.

16. The method as recited in claim 12, wherein the one or more recommendations are further based on feedback from the user in response to specific questions related to one or more attributes or interests of the user.

17. The method as recited in claim 12, wherein the at least one persona is associated with the user device based at least partly on a similarity between the location patterns associated with the user device and a location behavior associated with the at least one persona satisfying a predetermined threshold.

18. The method as recited in claim 17, disassociating the at least one persona from the user device based at least partly on the similarity between the location patterns associated with the user device and the location behavior associated with the at least one persona being below the predetermined threshold.

19. The method as recited in claim 12, wherein the associating at least one persona with the user device includes:
   determining that no pre-defined personas match the location patterns of the user device; and
   creating the at least one persona.

20. A method comprising:
   obtaining first location data that corresponds to one or more first physical locations associated with a user device;
   obtaining, from one or more merchant devices, second location data that corresponds to one or more second physical locations associated with a user, wherein the user is associated with the user device;
   determining location patterns associated with the user device based at least in part on the first location data and the second location data, the location patterns indicating places or events visited by the user device and times in which the places or events were visited;
   creating a persona that represents example location behaviors that are exhibited by users;
   associating the user device with the persona based at least in part on a similarity between the location patterns and the example location behaviors; and
   providing one or more recommendations of one or more other users, not previously socially connected with the user, the one or more other users being identified based at least in part on the persona, and location patterns common to both the user device and other user devices associated with individual other users of the one or more other users.

21. The method as recited in claim 20, wherein the example location behaviors are modifiable such that a number of user devices that are associated with the persona varies over time.

22. The method as recited in claim 20, wherein the recommendations include deals or information that are determined to be likely of interest to users associated with the persona.

23. The method as recited in claim 20, wherein the recommendations are further based on feedback from the user and the one or more other users in response to specific questions related to one or more attributes or interests of the user and the one or more other users.

24. The method as recited in claim 20, wherein the recommendations include information relevant to a current location of the user device, the information comprising one or more of current events, news, articles, events, or services.

25. One or more computer-readable media having computer-executable instructions that, when executed by one or more processors, cause the one or more processors to perform operations comprising:
- obtaining location data corresponding to a first current or past location associated with a user device;
- obtaining, from one or more merchant devices, second location data corresponding to a second current or past location associated with a user, wherein the user is associated with the user device;
- utilizing the first location data and the second location data to determine location patterns;
- identifying a persona that represents example location behaviors;
- identifying places or events that correspond to the example location behaviors;
- associating the places or events with the persona;
- associating the user device with the persona based at least in part on the location patterns and the example location behaviors; and
- providing one or more recommendations to the user, the one or more recommendations identifying at least one other user that is not currently socially connected to the user and that is associated with other location patterns that are determined to be similar to the location patterns.

26. The one or more computer-readable media as recited in claim 25, wherein the one or more recommendations include at least one of:
- one or more deals or information that are likely to be of interest to users associated with the persona; or
- an identification of one or more additional users that are also associated with the persona and that are likely to have interests in common with the user.

* * * * *